United States Patent [19]

Hickey, Jr.

[11] 3,927,562
[45] Dec. 23, 1975

[54] ENVIRONMENTAL PROFILER

[75] Inventor: George F. Hickey, Jr., Oxon Hill, Md.

[73] Assignee: The United States of America as represented by the Secretary of the Navy, Washington, D.C.

[22] Filed: Nov. 4, 1974

[21] Appl. No.: 520,818

[52] U.S. Cl. .............................................. 73/170 A
[51] Int. Cl.² .......................................... G01W 1/00
[58] Field of Search ...................... 73/170 A; 9/8 R

[56] References Cited
UNITED STATES PATENTS

| | | | |
|---|---|---|---|
| 3,267,419 | 8/1966 | Silverstein | 73/170 A X |
| 3,293,676 | 12/1966 | Link | 73/170 A X |
| 3,439,537 | 4/1969 | Pallos | 73/170 A |

*Primary Examiner*—Jerry W. Myracle
*Attorney, Agent, or Firm*—R. S. Sciascia; A. L. Branning; M. L. Crane

[57] ABSTRACT

An environmental profiler and method for use in water to measure the different parameters of the water along a vertical line from 3000 feet to the surface or any other desired depth. The device includes 64 individual gas generators each of which are sufficient to raise the device at a rate of 1.5 ft/sec. The device is programmed to vent the excess gas and to be lowered to the bottom after each trip until all gas generators have been activated. The sampling is made during descent and ascent and while at bottom and top, with the sampling information recorded digitally by instrumentation carried by the profiler.

5 Claims, 3 Drawing Figures

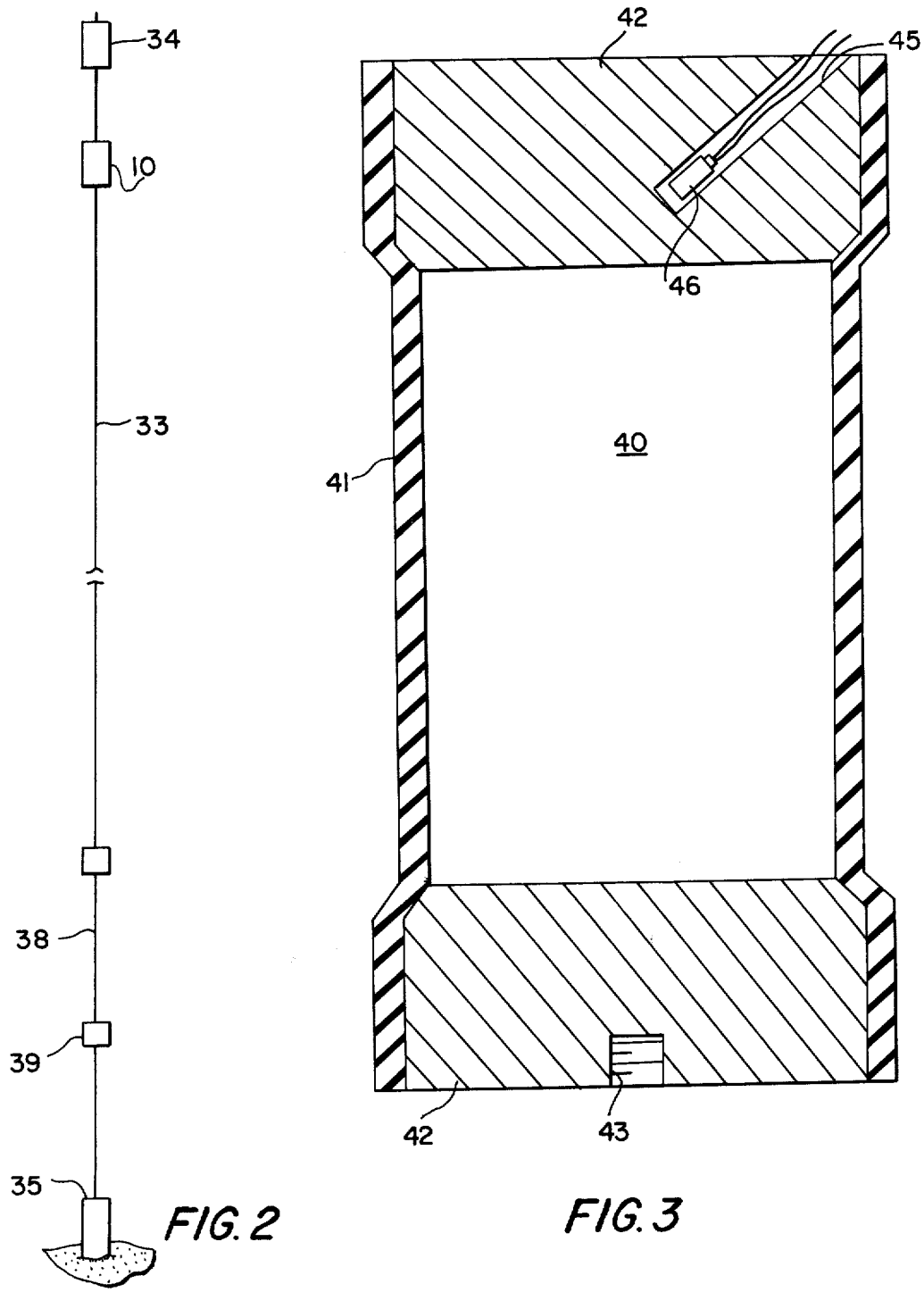

ENVIRONMENTAL PROFILER

CROSS REFERENCE TO RELATED CASE

This invention relates to the use of a hydrogen gas generator as set forth in copending patent application Ser. No. 520,769 filed Nov. 4, 1974.

BACKGROUND OF THE INVENTION

This invention relates to methods and devices for obtaining information relative to different characteristics or different parameters of water over a desired range along a line from the surface to the bottom.

Heretofore different systems have been used to determine different parameters of the waters of the seas. Instrumentation has been secured to cables at different water levels for obtaining information at the different levels. This type has voids between the instruments in which no information is obtained. Other systems require a cable attached to a ship which requires the use of a ship and its related environment. Instruments have been dropped from a ship or plane for one shot information detection. Other systems have been secured to buoys with the instrumentation spaced apart with the information telemetered to a plane ship or to shore. Some systems are weighted and sunk for release at a later time for collecting information at certain positions in the depths of the water.

SUMMARY OF THE INVENTION

This invention is directed to a hydrogen gas generator sensor assembly which is normally built with a negative buoyancy for descending into the water and is provided with a programmed hydrogen gas generator system for lifting the sensor system for detection of different parameters of the water as the sensor assembly descends and ascends. The assembly is guided along an anchored cable or rope to obtain a profile of the information from near the surface to the desired depth. A plurality of hydrogen gas generator elements are used for obtaining many profile traces over a long period of time. All instrumentation is carried by the assembly therefore the system is unattended and requires no outside signals for its operation. Thus, the sensor assembly is self contained. An acoustical signal release mechanism is used to release the assembly from its anchor so that the assembly may be retrieved and the recorded data reviewed.

It has become of great importance to underwater research personnel to obtain a profile of the water depths at various locations throughout the oceans and other waters. Amplitude, phase and frequency fluctuations of acoustic signals as well as other measurements in the ocean environmnet severely restrict applications of underwater acoustics as well as other undertakings for different purposes. Therefore, it has become important to determine the acoustical properties and other phenomena at different depths and in different areas of the waters. The hydrogen gas generator is designed to move a detector assembly upwardly along a fixed cable and then permit the assembly to descend to the bottom and a second hydrogen generator raises the assembly all on programmed command. This is repeated for as many times as there are hydrogen gas generators assembled within the assembly, and over a period of time programmed into the system. The system may be dropped and left unattended for long periods of time. After the programmed time period has elapsed, the assembly is acoustically released from its anchor, collected and the recorded history of the up and down measurements of the sea parameters may be analyzed. As can be seen, different measuring systems may be placed anywhere within the oceans, seas, etc., for measuring profiles of the water along a specific depth.

The hydrogen gas generator-system has been set forth in an article "Hydrogen Gas Generator for Deep Sensor" by W. H. Barber et al., AIAA paper No. 73-1202. AIAA/SAE 9th Propulsion Conference, Las Vegas, Nevada, Nov. 5–7, 1973 by American Institute of Aeronautics and Astronautics, 750 3rd Avenue, New York, New York 10017.

BRIEF DESCRIPTION OF THE DRAWINGS

FIG. 2 illustrates a system deployed for use;
and
FIG. 3 illustrates a hydrogen gas generator.

DETAILED DESCRIPTION

Figure 1:
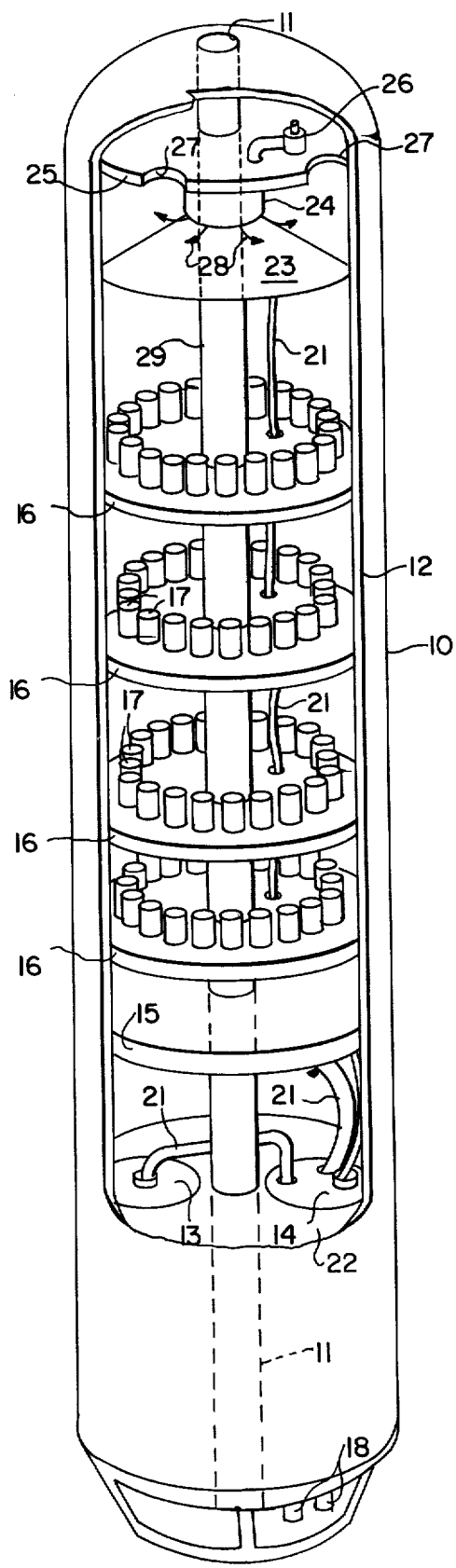
FIG. 1 illustrates a partial cross-sectional view of a sensor-assembly including hydrogen gas generators.

Now referring to the drawing, wherein like characters refer to like parts, there is shown for illustrative purposes a gas generator-sensor assembly suitable for carrying out the invention. The assembly includes an outer housing 10 including a tube 11 along its axis over the length of the housing for the purpose of guiding the housing along a suspended cable or rope. An inner housing 12 houses the battery pressure housing 13, the instrumentation housing 14, the firing matrix 15, the spaced shelves 16 upon which the hydrogen gas generators 17 are secured. The sensors 18 and the remainder of the elements essential for carrying out the invention. Water proof connectors and cables 21 are used for conducting electrical energy to the various elements. The batteries and electrical instrumentation are well known in the electrical art and it is not believed essential to specifically described each element. The firing matrix 15 and the shelves 16 are secured upon spaced rods as is well known in the mechanical art and are not shown for clarity purposes. The instrumentation is assembled on the rod structure secured within the housing 12, and the housing 12 is slid into the outer housing and secured therein. Openings to the outside water are provided in each housing so that water enters the confines of each housing therefore the pressure on the inside of the housing will equal the pressure on the outside of the housings. Therefore the housings will not be crushed at great pressures of operation.

The instrumentation adds weight to the housing, therefore in order to have an assembly with about 2 lbs., of negative pressure for normal descent of the device, flotation material 22 must be added to the housing. The flotation material is added in the area of the battery pack and instrumentation housing and provides lift, to overcome the weight ot the instrumentation and housing.

In order to trap generated hydrogen gas, a conical shaped gas deflector 23 is secured near the upper end of housing 12 and funnels the hydrogen gas into an open bottom cylindrical accumulator 24. The upper end of the accumulator is closed by plate 25 upon which is secured a gas pressure vent valve 26 which connects with accumulator 24 through plate 25. The pressure vent valve 26 is electrically operated and programmed to open for release of hydrogen gas at the time desired to permit the sensor-assembly to descend to the bottom. The central conical end of the gas deflector extends into the accumulator area a short distance and is spaced from the inner surface of the accumulator to permit water to enter or escape from the accumulator depending upon operation conditions of ascent and descent. The area of the plate 25 outside of the area of the accumulator is provided with apertures 27 which permits water to enter or escape as the conditions arise. Also any excess of hydrogen gas that over fills the accumulator escapes between the conical end of the gas deflector and the bottom end of the accumulator as shown by the arrows 28. A plastic tube 29 extends downwardly from the accumulator to below the last shelf 16 to prevent hydrogen gas from escaping along the center.

FIG. 2 illustrates the sensor-assembly-hydrogen gas generator deployed for use in obtaining desired data relative to the water in which the system is deployed. As shown, the sensor-assembly is threaded onto a line or cable 33 which is secured at one end to a float or buoy 34 and at the opposite end to an anchor cable 38. The length of the cable 33 may be any desired length such as 3,000 feet and the anchor cable 38 is sufficiently long to pay-out the anchor 35 to anchor on the bottom of the sea. In order to release the cable from the anchor for retrieval, an acoustical signal release mechanism 39 is provided. When acoustically activated, the release mechanism releases the cable and the buoy floats to the surface of the water. The buoy that holds the cable 33 in place for descent-ascent of the sensor assembly is normally placed 200 feet below the surface of the sea so that is will not be in the way of shipping or accidently hit by a surface vessel.

The hydrogen gas generator is shown by illustration in FIG. 3. As shown, the hydrogen generator includes a solid slug of lithium hydride, LiH, 20 and binder formed under 12 tons of pressure. The solid slug of LiH is slid into a rubber boot 41 or housing of extensible material having an inside diameter equal to the outside diameter of the slug. The boot is closed at the bottom and top ends by use of plastic or Plexiglas end caps 42 which are of a greater outer diameter than the inner diameter of the boot. The inside surface of the boot is smooth so that the Plexiglas end caps may be pressed into the boot, stretching the boot around the end caps for a tight fit. The bottom end cap is provided with a threaded hole 43 therein on the axis thereof by which the hydrogen generator may be held in place on a partition 16 or shelf within the sensor assembly. The upper end cap is provided with a 45° angle hole 45 directed toward the axis of the device from the upper surface with the hole extending to within ¼ inch of the bottom surface. A standard blasting cap 46 is secured within the hole for rupturing the end cap on command.

As an example, the rubber boot may be 2 inch inside diameter ⅛ inch thick and 5¾ inches in length. The LiH solid slug has a 2 inch outside diameter, 3¾ inches in length, placed within the boot with equal lengths of the boot extending beyond each end of the slug. The Plexiglas end caps are 2¼ inches in outside diameter with 1 inch thickness and inserted into the ends of the boot as shown. The inner end of the end caps press against the ends of the slug.

Since the LiH slug is formed under 12 tons of pressure the hydrogen gas generator may be placed at great depths without further compression of the LiH slug. Further, the pressure of the water at the depths will be directed inwardly against the boot, thereby producing greater pressure on the boot, against the slug and end caps, this pressure will aid in holding the end caps within the boot. Since the LiH is water active, the slug must be assembled in the boot in a dry surrounding.

It has been determined that the above described LiH slug will displace three liters of water from the assembly and produce 7 pounds of lift at a depth of 3000 feet.

In operation, the various elements, hydrogen gas generators (any desired number), electrical parts, batteries, instruments, programmer, timer, sensors, flotation material, etc., are properly assembled into the housing so that the assembly has a 2 pound negative buoyancy. The assembly is threaded onto a cable which is connected to a buoy with the accumulator end of the assembly toward the buoy. An anchor is connected to the other end of the cable. For the purposes of explanation, a rope or cable of 3000 feet will be used along which the sensor-assembly will operate. The described hydrogen gas generator will produce 7 pounds of lift at 3000 feet and will raise the assembly 1.5 ft/sec. over the length of the 3000 feet rope. One purpose of the system is to detect the different parameters and record data simultaneously over a large area of the sea. The timer devices are set to operate at the same time, on the same day, and for the same time period giving sufficient time prior to operation to deploy the desired number of units. Once deployed, the sensor assembly will sink and sit at the 3000 foot level until it receives a command from the programmer. At the designated date and time, the programmer will activate the sensors, digital recording equipment, etc. The blasting cap of the first hydrogen gas generator is activated, shattering the end cap thereof to permit water to enter the generator housing thereby chemically activating the lithium hydride. The lithium hydride reacts with water according to the formula:

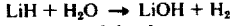

$$LiH + H_2O \rightarrow LiOH + H_2$$

The generated hydrogen gas bubbles upwardly and is deflected into the gas accumulator displacing the water therein. The water escapes between the conical end of the deflector and the bottom of the accumulator and out through the vent holes 27. The hydrogen gas is continually generated until all of the lithium hydride is expended. As the hydrogen gas is generated, the gas will enter the accumulator and any excess gas will secape between the bottom of the accumulator and the upper surface of the gas deflector, as shown by the arrows 28. During the time of ascent the sensors will be operating to obtain a data profile of the desired parameters of the sea along the length of the cable. Once the assembly has completed its ascent and it is desired for the assembly to descent the vent valve is programmed to open and allow all the hydrogen gas to escape through the vent valve. The water will enter the bottom of the accumulator to force the hydrogen gas out of the vent valve. Once the negative buoyancy has been established, the sensor-assembly will descend along the cable to the desired depth. During descent, during ascent, while at the upper end of the cable and while at the lower end of the cable, information will be obtained by the sensors.

The hydrogen gas generators are programmed to successively activate in order to raise the sensor assembly when desired and for as many times as there are gas generators assembled within the assembly. At the end of the programmed time period for operation which may be days, weeks, or even months, the assembly may be retrieved by activating the acoustical connector 39 that holds the anchor cable to the sensor-assembly operative cable.

The sensor-assembly is self contained, it operates without attendance once it has been deployed and a plurality of the sensor-assembly devices may be deployed for simultaneous operation.

The device may be operated at any depth at which the instrument package will operate since water is on the inside of the housing to equalize the pressure.

The lithium hydride slugs may be made longer to produce more hydrogen for greater depth operation or the programmer may be programmed to ignite two or more generators simultaneously to produce more hydrogen.

Obviously many modification and variations of the present invention are possible in light of the above teachings. It is therefore to be understood that within the scope of the appended claims the invention may be practiced otherwise than as specifically described.

What is claimed and desired to be secured by letters patent of the United States is:

1. A self descending and ascending water parameter detection device; which comprises,
   a normally negative buoyant assembly including instrumentation for detecting different water parameters during ascent and descent;
   a housing,
   said housing including therein a gas accumulator,
   a plurality of gas generators within said housing for individually generating gas within said housing,
   means for programming sequential activation of said gas generators for separately generating a gas which accumulates in said accumulator for raising said detection device,
   means for releasing gases from said gas accumulator subsequent to being raised to permit descent of said detection device,
   whereby said detector device is raised each time a gas generator is activated and subsequently lowered each time by releasing gases from said gas accumulator.

2. A self descending and ascending water parameter detection device as claimed in claim 1 which includes,
   a cable,
   said cable secured between a buoy and a stop connection located at the end of said cable,
   an anchor secured to said cable for anchoring said cable in a water environment,
   means for securing said detection device for movement along said cable,
   whereby said detection device descends and ascends along said cable in response to activation of said gas generators with subsequent release of gases from said accumulator.

3. A self descending and ascending water parameter detection device as claimed in claim 1; which includes,
   a gas deflector within said housing between said gas generators and said gas accumulator for deflecting generated gas into said accumulator.

4. A method of obtaining a data profile of oceanic parameters by use of a negative buoyancy oceanic parameter sensor assembly which traverses a desired length of cable secured between a buoy at one end and an anchor at the opposite end of the cable when anchored in a desired area of water; comprising
   mounting a plurality of gas generators and data sensors within said negative buoyant sensor-assembly which normally sinks when placed in water,
   securing said sensor-assembly onto said cable for movement along said cable,
   setting a programmer-timer for sequentially activating said gas generators and data sensors to produce a gas and to record data in accordance with a timed sequence,
   placing said buoy-cable-anchor sensor-assembly in a desired surrounding of water and permitting said sensor-assembly to sink to its depth along said cable,
   activating at least one gas generator for producing sufficient gas to overcome said negative buoyancy of said sensor-assembly to raise said sensor-assembly,
   simultaneously activating said data sensors to record data during ascent and descent,
   collecting sufficient gas in a gas accumulator within said sensor-assembly for raising said sensor-assembly along said cable upwardly to said buoy,
   permitting said collected gas to remain in said gas accumulator until lowering of said assembly is desired,
   opening a valve to said gas accumulator to permit all collected gas to escape thereby permitting said sensor-assembly to sink along said cable,
   permitting said sensor-assembly to remain sunk until time to raise said sensor-assembly again,
   activating other gas generators to raise said sensor-assembly subsequent to lowering thereof and activating said data sensors for as many times as there are gas generators,
   whereby data is obtained and recorded during each ascent and descent for as many times as there are activated gas generators.

5. A method of obtaining a data profile of oceanic parameters in a desired area of water as claimed in claim 4; which includes,
   subsequent to obtaining said data profile, activating an explosive device to release said cable and instrument for surfacing and retrieving said instrument.

* * * * *